(12) United States Patent
Grieve

(10) Patent No.: US 8,196,686 B2
(45) Date of Patent: Jun. 12, 2012

(54) SUPERCHARGED HYBRID INPUT DIFFERENTIAL ENGINE SYSTEM

(75) Inventor: Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 358 days.

(21) Appl. No.: 12/316,927

(22) Filed: Dec. 18, 2008

(65) Prior Publication Data

US 2010/0155157 A1  Jun. 24, 2010

(51) Int. Cl.
*B60K 6/445* (2007.10)
(52) U.S. Cl. .......... 180/65.235; 180/65.265; 180/65.275
(58) Field of Classification Search ............... 180/65.21, 180/65.28, 65.26, 65.235, 65.265, 65.6, 65.7, 180/65.275; 123/559.1, 559.3, 561; 60/608, 60/609
See application file for complete search history.

(56) References Cited

U.S. PATENT DOCUMENTS

| | | | |
|---|---|---|---|
| 5,888,162 A * | 3/1999 | Moeller et al. ................. 475/72 |
| 5,974,046 A * | 10/1999 | Kim et al. ................. 370/241.1 |
| 6,672,050 B2 * | 1/2004 | Murata et al. .............. 180/65.26 |
| 6,790,158 B2 * | 9/2004 | Tabata ............................. 477/33 |
| 7,000,601 B2 * | 2/2006 | Yasui et al. .................... 123/561 |
| 7,052,435 B2 * | 5/2006 | Tabata et al. .................. 477/107 |
| 7,416,502 B2 * | 8/2008 | Ulbrich .......................... 475/72 |
| 7,743,679 B2 * | 6/2010 | Iwata et al. ..................... 74/443 |
| 7,765,805 B2 * | 8/2010 | Lofgren .......................... 60/608 |
| 7,765,806 B2 * | 8/2010 | Clark .............................. 60/608 |
| 2009/0291803 A1 * | 11/2009 | Moeller ......................... 477/110 |

* cited by examiner

*Primary Examiner* — Hau Phan
(74) *Attorney, Agent, or Firm* — Thomas N. Twomey

(57) ABSTRACT

A hybrid input differential engine system comprising a planetary gear set. Preferably, an ICE is connected to the planet gear carrier, the output shaft is connected to the ring gear, and the sun gear is connected to a supercharger/expander and an electric or hydraulic motor/generator. As engine torque increases, the supercharger speeds up, increasing torque still further, enabling a small displacement engine to have very high torque at low RPM. In cruise conditions, the sun gear direction is reversed by the motor/generator, causing the supercharger to act as an expander for efficiently throttling the engine. The motor/generator modulates the speed/torque relationships between the engine and the supercharger/expander. A second motor/generator may be used on the output shaft. The electric machines and electric storage may be downsized because less electrical power is needed for the operation of the system.

11 Claims, 3 Drawing Sheets

SUPERCHARGED HYBRID INPUT DIFFERENTIAL ENGINE SYSTEM

TECHNICAL FIELD

The present invention relates to drive systems for vehicles; more particularly, to hybrid input differential engine systems; and most particularly, to a hybrid input differential engine system incorporating a supercharger.

BACKGROUND OF THE INVENTION

The Toyota® Prius® is generally and presently regarded in the automotive world as a state-of-the-art high efficiency vehicle. In the Prius® drivetrain architecture, referred to hereinafter as the "Prior Art drivetrain" a naturally aspirated "Atkinson" Cycle gasoline internal combustion engine (ICE) is combined with two motor/generators and a planetary power split device (PSD). A single planetary gear set is used in an electrically-controlled Continuously Variable Transmission (eCVT). Control of the speed and torque of the two motor/generators has the effect of varying the gear ratio from the ICE to the output shaft through the PSD.

Although the Prior Art drivetrain offers a significant fuel economy improvement compared to current non-hybrid vehicles, especially on urban stop-and-go driving cycles, there are some notable drawbacks to its system.

First, the cost of the Prior Art drivetrain is significantly higher than that of a standard non-hybrid powertrain, because of the relatively high-power electric machines (also referred to herein as "motor/generators"), the associated power electronics, and the large high-power battery system.

Second, because of this same content plus an ICE having a relatively low power density, the Prior Art drivetrain weight is also much higher than that of a standard vehicle.

A trend in the automotive industry is the use of ICEs that have relatively low power ("downsized") but are boosted by an exhaust-powered turbocharger using "free" energy. Such engines can reduce engine weight and improve fuel economy on typical light-duty driving cycles. Small-displacement direct-injection engines can have efficiency similar to that of the Prior Art drivetrain by using a turbocharger to boost torque and power.

Turbochargers are very efficient at constant high-speed high-load conditions where the volume and driving force of engine exhaust is also high. However, in lower speed stop-and-go driving, turbocharger efficiency is lower and there is no inherent ability in such engine configurations to use regenerative braking, as there is in a Prior Art drivetrain configuration. Engine torque tends to be low at and just above idle speed, resulting in low initial acceleration performance, non-linearity of torque response, and pollution challenges with transient emissions.

What is needed in the art is a lower-cost, lower-weight powertrain system for a vehicle that retains the attractive attributes of the Prior Art drivetrain, but which is compatible with the trend to downsized boosted engines, and which mitigates the poor low engine speed performance of prior art downsized turbocharged systems.

It is a principal object of the present invention to provide an improved powertrain system for a vehicle.

SUMMARY OF THE INVENTION

Briefly described, a hybrid input differential engine system in accordance with the present invention comprises a planetary gear set having two inputs and one output. The planetary gear set includes a sun gear, a plurality of planet gears engaged by the sun gear and tied together by a gear carrier, and a ring gear engaged by the planet gears. An ICE is connected to the gear carrier (in a currently-preferred embodiment), and the output is connected to the ring gear, as in the Prior Art drivetrain system. However, the sun gear is connected to a supercharger/expander. An electric or hydraulic motor-generator optionally may also be connected to the sun gear. When the supercharger alone is used, the steady state speed and torque are fixed by the pneumatic load on the supercharger, which load is a function of the speed ratio of the supercharger to the ICE, as this determines the pressure ratio across the supercharger. Thus, as engine torque increases, the supercharger speeds up relative to the engine speed and operates at a higher pressure ratio, increasing engine torque still further. This effect is similar to, but enhanced over, the effect a Prior Art drivetrain has in acceleration from low vehicle speeds. This effect allows a suitably designed engine to have very high torque at low RPM, enabling good driveability with a small displacement engine.

In cruise conditions, the sun gear is motored in reverse to normal direction or, optionally, may be braked (stopped) or slowed down to a free-wheeling state using an optional clutch. With the case of motoring, the supercharger may act as an expander. With appropriate valving or porting of the supercharger, the pressure drop across the expander generates a torque to cause the reverse rotation. A first optional motor/generator may be used to modulate the speed/torque relationships between the ICE and the supercharger/expander and to manage transient conditions smoothly. A second optional motor/generator may be used on the output shaft (analogous to the prior art system). The motor/generator machines may be downsized significantly over their prior art counterparts because substantially less power is needed for the operation of the eCVT (net of the supercharger/expander load).

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

The invention employs a planetary power split device and mounts a supercharger on one of the members of the planetary gear set. In principle, an ICE, a supercharger plus first optional motor/generator, and an output shaft plus second optional motor/generator may be connected respectively in any arrangement to the sun gear, planet gear carrier, and ring gear of a planetary gear set. In one aspect of the invention, as described below, the arrangement includes a twin-screw Lysholm® type supercharger on the "sun" gear of the planetary system, an ICE on the planet gear carrier, and an output shaft on the ring gear. The twin-screw supercharger can inherently be used as an expander wherein it is turned in reverse to a normal direction and with valves or porting used to reverse the flow direction of gas through the rotors. Other supercharger types, such as Roots® type or "Centrifugal" superchargers may use the optional clutch since they are efficient only when turning in one direction.

Figure 1:
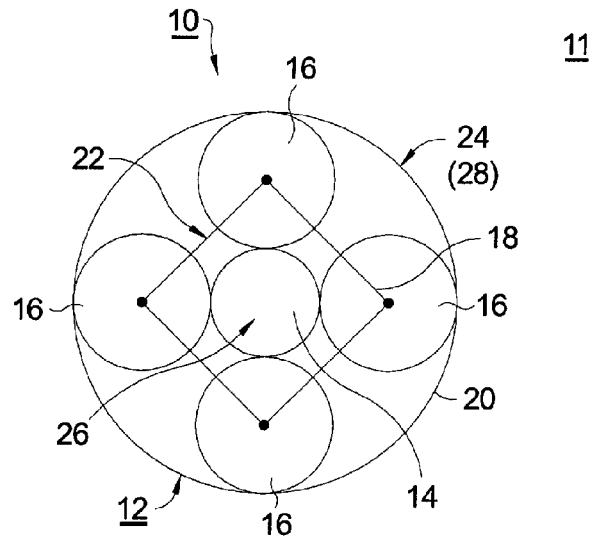
FIG. 1 is a schematic drawing of a prior art Prius® eCVT system.

Referring to FIG. 1, a Prior Art drivetrain 10 for use in a vehicle 11 includes an eCVT comprising a planetary gear set 12 having two inputs and one output. The planetary gear set 12 includes a sun gear 14, a plurality of planet gears 16 engaged by sun gear 14, the planet gears being tied together by a gear carrier 18, and a ring gear 20 engaged by planet gears 16. An ICE 22 is connected to gear carrier 18; output shaft 24 leading to vehicle 11 is connected to ring gear 20; and a motor/generator 26 is connected to sun gear 14. A second motor/generator 28 is used on the output shaft.

Figure 2:
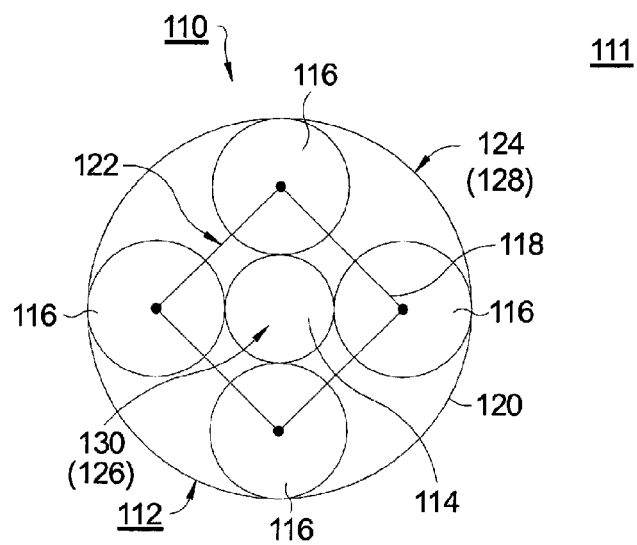
FIG. 2 is a schematic drawing of an improved eCVT system in accordance with the present invention.

Referring to FIG. 2, in an exemplary embodiment of a hybrid input differential engine system 110 for use in a vehicle 111, an eCVT comprises a planetary gear set 112 having two inputs and one output. The planetary gear set 112 includes sun gear 114, a plurality of planet gears 116 engaged by sun gear 114 and tied together by a gear carrier 118, and a ring gear 120 engaged by planet gears 116. An ICE 122 is exemplarily connected to gear carrier 118; output shaft 124 leading to vehicle 111 is connected exemplarily to ring gear 120; and a supercharger 130 is connected exemplarily to sun gear 114. Optionally, a first motor/generator 126 is also connected to sun gear 114. A second optional motor/generator 128 may be used on output shaft 124 (as in the Prior Art drivetrain).

Either or both of the motor/generators may be electric, hydraulic, pneumatic, or a combination thereof. Electric would be a likely choice for light duty vehicles, but hydraulic may prove to be attractive for heavy duty vehicles and may be simpler and lower cost in some applications.

System 110 defines a low cost drive system which allows a supercharger to be driven at a variable speed relative to the engine. The system may optionally drive other accessories such as an air conditioning compressor (not shown).

A Lysholm®-type supercharger is preferred as it can function as either a compressor or an expander with relatively high efficiency in forward and reverse directions, respectively. Other supercharger types can be used with an optional clutch (not shown), resulting in a CVT system with a smaller range of effective gear ratios.

Referring now to FIGS. 3 through 6, when system 110 is in compression/acceleration mode, sun gear 114 and supercharger 130 turn in the same direction as carrier 118 and engine 122. Supercharger 130 provides a high boost to engine 122 by taking in fresh air 132 and providing compressed air 134 to engine 122. A valve mechanism 135, preferably a four-way switching valve or valving equivalent, is shown; alternatively, other configurations of on/off valves or passive (check) valves may be used to similar effect. Preferably, valve 135 is configured to permit flow-through between opposing ports at intermediate positions of the rotor. It will be seen that in such a position, the valve permits compressed 134 air or expanded air 136 to be passed directly between the inlet and the outlet of supercharger 130, which thereby does no net work on the air. This "bypass" mode is useful under engine use conditions wherein the supercharger is not needed, and any net compression or expansion is simply parasitic.

Figure 3:
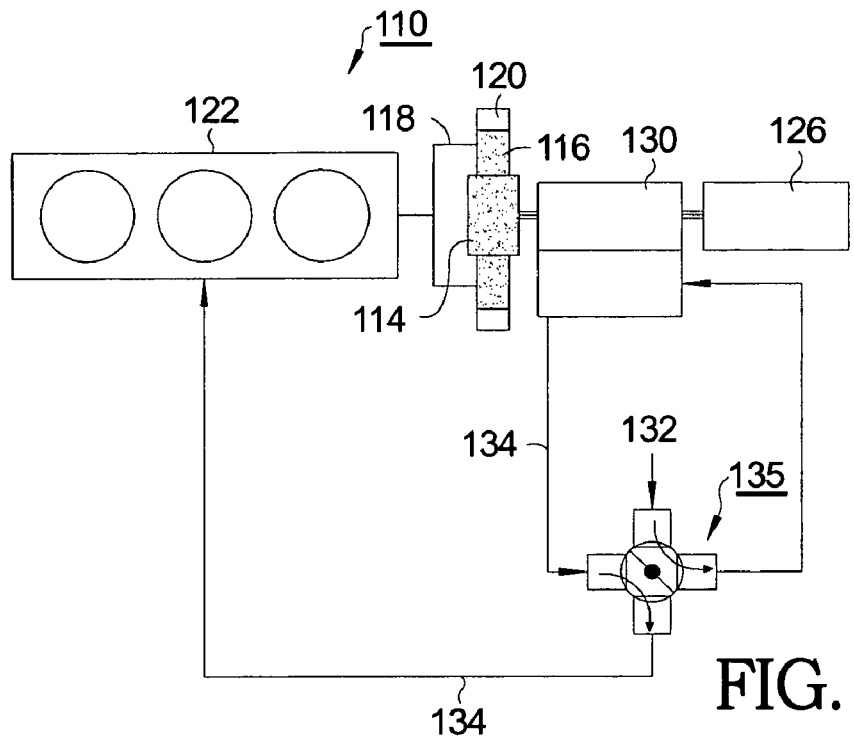
FIG. 3 is a schematic drawing of the improved eCVT system operating in Acceleration (boosted) mode wherein the supercharger spins in a forward direction to boost the ICE.

In the mode shown FIG. 3, when supercharger 130 is used alone the steady state speed and torque is fixed by the pneumatic load, which is a function of the speed ratio of the supercharger and the engine, because this determines the pressure ratio across the supercharger. Thus, as engine torque increases, the supercharger speeds up relative to the engine and operates at a higher pressure ratio, increasing engine torque still further. This has a similar but enhanced effect compared to the prior art eCVT 10 in acceleration from low vehicle speeds. This allows a suitably designed engine to have very high torque at low RPM, enabling very good driveability of a vehicle with a small displacement engine. This performance is not possible for a comparably-sized prior art turbocharged engine system.

Figure 5:
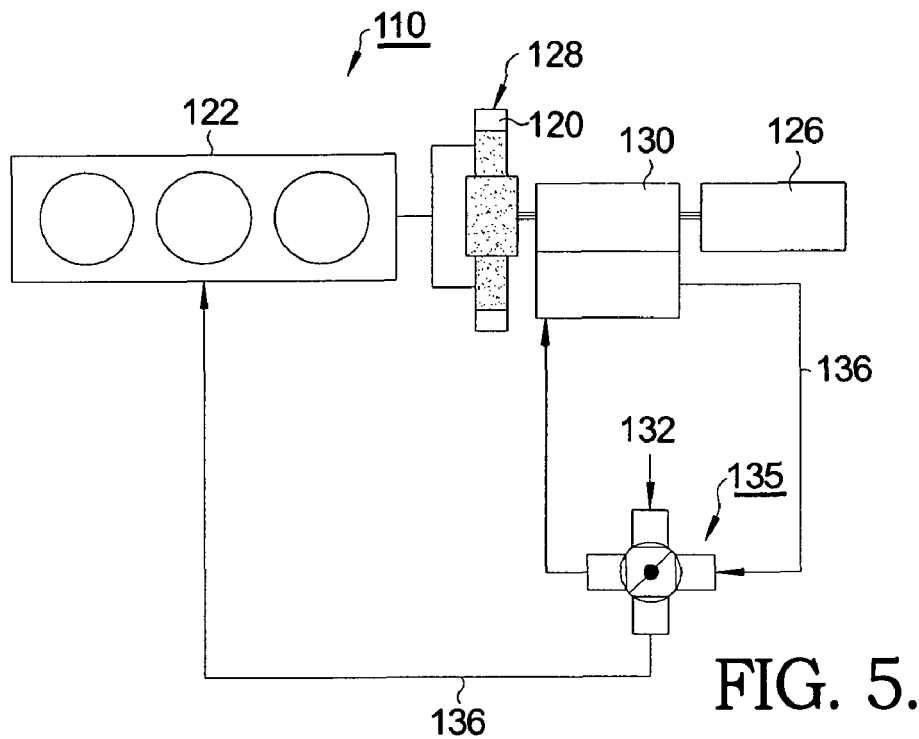
FIG. 5 is a schematic drawing of the improved eCVT system operating in Cruise (throttled) mode, wherein the supercharger spins in reverse direction and acts as an expander.

Referring to FIG. 5, when system 110 is in expansion/overdrive mode, sun gear 114 and supercharger 130 are motored by motor/generator 126 slower than or in the direction opposite to carrier 118 and engine 122. Supercharger 130 then operates as an expander rather than a compressor and throttles the engine 122 by taking in fresh air 132 and providing rarified air 136, i.e., partial vacuum, to engine 122 because of the pressure drop across the supercharger 130. This mode is regenerative, and some energy is recovered in throttling the engine intake air. First motor/generator 126 modulates speed/torque relationships between engine 122 and supercharger/expander 130 to manage transient conditions smoothly.

An important benefit of system 110 over prior art system 10 is that supercharger/expander 130 permits significant downsizing of the electric machines (motor/generators) and their associated electronic controls. The corresponding components in the prior art are relatively large, heavy, and expensive, being approximately the size and weight of the engine. Thus system 110 affords a significant reduction in overall vehicle weight.

High power mode during accelerations uses first motor/generator 126 as a generator, and having supercharger 130 operative on the same planetary gear element allows generation of the correct engine torque with much less electric generation than in the prior art, and thus less motoring into second motor/generator 128 and the potential to reduce the size of the battery or equivalent energy storage (not shown).

Cruise modes tend to require lower power, so the generator power required to make system 110 work is the limiting factor for sizing the motor/generators and power electronics. Further, the expander mode of the supercharger allows a modest reduction in motoring power of first motor/generator 126 and generating power of second motor/generator 128, resulting in reduced electrical parasitics in light load operation (such as a moderate speed highway cruise condition).

Figure 4:
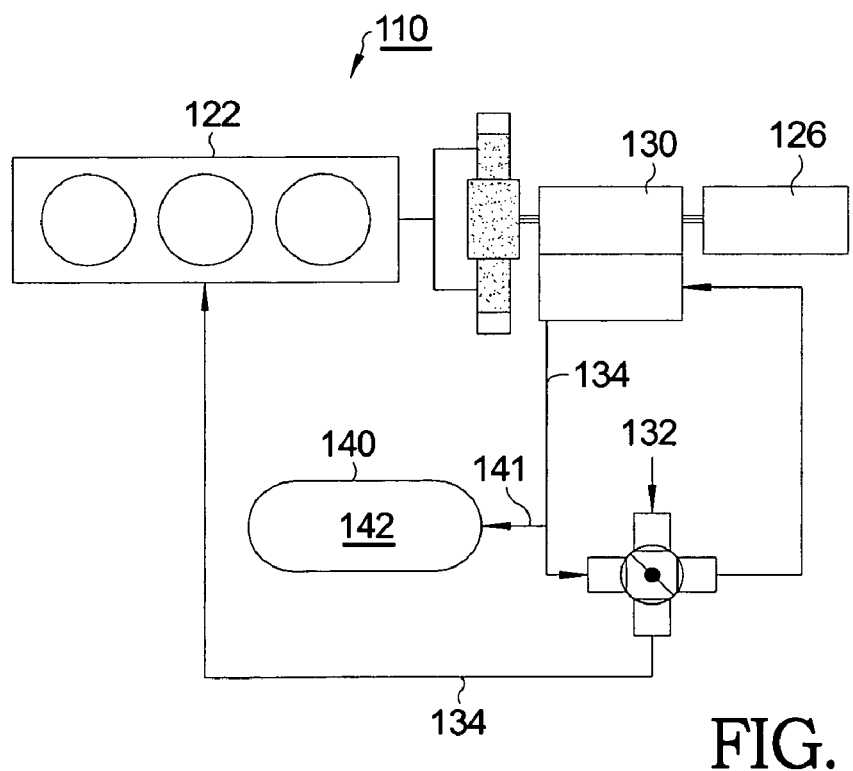
FIG. 4 a schematic drawing of the improved eCVT system operating in Acceleration (boosted) mode, showing part of the compressed air from the supercharger diverted to storage.
Figure 6:
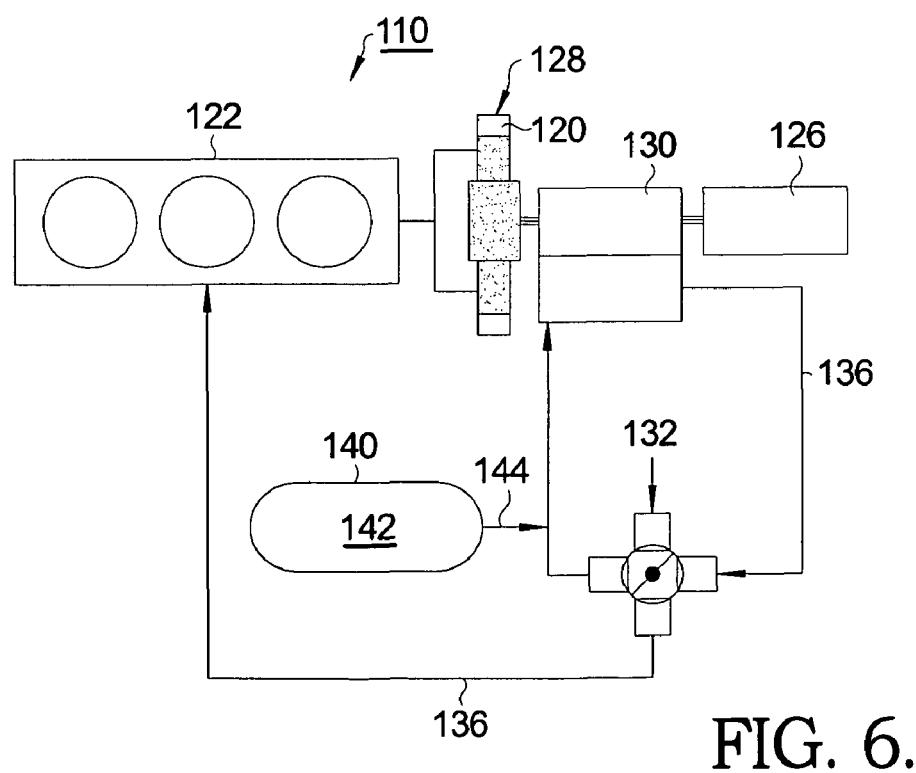
FIG. 6 is a schematic drawing of the improved eCVT system operating in Cruise (throttled) mode, showing recovery and use of compressed air from storage.

Refering now to FIGS. 4 and 6, use of a pneumatic accumulator 140 in the supercharger flow path allows the system to operate as an air/hybrid wherein surplus compressed air 142 produced during low speed, high torque conditions may be banked 141 (FIG. 4) and then later used 144 (FIG. 6) in higher speed, low torque conditions.

Some vehicular advantages of a system 110 in accordance with the present invention are:
  a) the potential for a large reduction in cost, size, weight, and capacity of the motor/generators and associated power electronics;
  b) a similar reduction in the cost, size, weight, and capacity of an energy storage device (not shown), typically a Li-ion or NiMH battery, which can permit use of a small pneumatic energy storage and/or an ultracapacitor as the only significant energy storage capability within system 110;

c) the potential for significant downsizing of engine 122, for example, to three cylinders instead of six, or to two cylinders instead of four, while retaining very high torque at low engine speeds, and excellent powertrain smoothness;

d) the ability to recover energy from lightly throttling the engine by using the supercharger as an expander; modestly-throttled operation is useful for other reasons, e.g., low noise, ability to meter EGR, and ability to modulate torque smoothly and quickly, and system 110 significantly reduces the parasitic pumping loss which is otherwise associated with throttling in the prior art;

e) compatibility with direct injection diesel (compression-ignited) engines, by supplying lots of transient air and mitigating "smoke" and HC emissions associated with operation near the low RPM "lug" line;

f) compatibility with direct injection gasoline (spark-ignited) engines, by manipulating the volumetric efficiency, charge temperature and speed/torque relationship during low RPM transients; and g) use of pneumatic energy storage, for example, during engine braking, to reduce the effective energy cost of supercharged operation and to mitigate the power levels needed in the optional hybrid (electric or hydraulic) motor/generator devices.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A hybrid input differential engine system for use in a vehicle, comprising:
    a) a planetary power split device having a sun gear, a plurality of planet gears, a planet gear carrier, and a ring gear;
    b) an internal combustion engine directly connected to said planetary power split device;
    c) an output shaft directly connected to and driven by said planetary power split device; and
    d) a supercharger directly connected to said planetary power split device and connected to said engine through said planetary power split device.

2. A system in accordance with claim 1 wherein each of said engine, said output shaft, and said supercharger is directly connected in an arrangement respectively to any of said sun gear, said planet gear carrier, and said ring gear.

3. A system in accordance with claim 1 wherein said engine is directly connected to said planet gear carrier, said output shaft is directly connected to said ring gear, and said supercharger is directly connected to said sun gear.

4. A system in accordance with claim 1 further comprising a first motor/generator directly connected with said supercharger to said planetary power split device.

5. A system in accordance with claim 1 further comprising a second motor/generator directly connected with said output shaft to said planetary power split device.

6. A system in accordance with claim 1 wherein said supercharger functions as a compressor when driven in a first rotational direction and as an expander when driven in an opposite rotational direction.

7. A system in accordance with claim 1 wherein said internal combustion engine is selected from the group consisting of compression-ignited and spark-ignited.

8. A system in accordance with claim 1 further comprising a valve mechanism connected to said engine and to inlet and outlet ports of said supercharger to permit reversal of the direction of air flow when said supercharger is being motored in the reverse direction and to bypass said supercharger when said supercharger is operating neither as a supercharger nor an expander.

9. A system in accordance with claim 8 wherein said valve mechanism is a four-way valve or valving equivalent.

10. A system in accordance with claim 1 wherein a clutch is provided to slow or stop the rotational speed of said supercharger under conditions wherein said engine boosting is not required.

11. A system in accordance with claim 1 wherein a compressed air reservoir is used to store a portion of the air compressed by said supercharger and wherein said compressed air is later supplied from said reservoir to said engine or said supercharger/expander.

* * * * *